United States Patent
Wang et al.

(10) Patent No.: US 11,226,806 B2
(45) Date of Patent: Jan. 18, 2022

(54) PROJECTOR AND PROJECTOR FIRMWARE UPDATING METHOD

(71) Applicant: Coretronic Corporation, Hsin-Chu (TW)

(72) Inventors: Yi-Fa Wang, Hsin-Chu (TW);
Shih-Min Wu, Hsin-Chu (TW);
Ping-Chen Ma, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/792,840

(22) Filed: Feb. 17, 2020

(65) Prior Publication Data

US 2020/0272449 A1 Aug. 27, 2020

(30) Foreign Application Priority Data

Feb. 26, 2019 (CN) .......................... 201910141644.5

(51) Int. Cl.
*G06F 8/65* (2018.01)
*H04L 29/06* (2006.01)
*H04L 29/08* (2006.01)

(52) U.S. Cl.
CPC .............. *G06F 8/65* (2013.01); *H04L 63/083* (2013.01); *H04L 67/10* (2013.01); *H04L 67/141* (2013.01); *H04L 67/34* (2013.01)

(58) Field of Classification Search
CPC ......... G06F 8/65; H04L 63/083; H04L 67/10; H04L 67/141; H04L 67/34
See application file for complete search history.

(56) References Cited

U.S. PATENT DOCUMENTS

| 2004/0041989 A1* | 3/2004 | Olson | G03B 21/26 |
| | | | 353/122 |
| 2007/0207766 A1* | 9/2007 | Hayama | G03B 23/00 |
| | | | 455/352 |

(Continued)

FOREIGN PATENT DOCUMENTS

CN 100367158 2/2008

OTHER PUBLICATIONS

Kodak LUMA 350 Portable Smart Projector Support, [Online], 2017, pp. 1-1, [Retrieved from internet on Mar. 19, 2021], <https://www.kodakphotoplus.com/pages/luma-350-portable-smart-projector-support> (Year: 2017).*

(Continued)

*Primary Examiner* — S. Sough
*Assistant Examiner* — Zengpu Wei
(74) *Attorney, Agent, or Firm* — JCIPRNET (57) ABSTRACT

The disclosure provides a projector and a projector firmware updating method therefor. The projector is connected to a cloud server through a network connection. The first processor of the projector executes a first firmware updating process corresponding to a request firmware, including: identifying the first request unique identification code of the projector and the request firmware serial number of the request firmware, and transmitting the first request unique identification code and the request firmware serial number to the cloud server; if the request firmware is not the latest version, receiving the first target firmware from the cloud server and updates the request firmware by using the first target firmware, and completing the first firmware updating process. The projector and projector firmware updating method of the disclosure can efficiently update the firmware to the latest or specific version according to the unique identification code of the projector.

14 Claims, 4 Drawing Sheets

(56) References Cited

U.S. PATENT DOCUMENTS

| | | | | |
|---|---|---|---|---|
| 2011/0302574 A1* | 12/2011 | Yoshikawa | ............... | G06F 8/65 |
| | | | | 717/173 |
| 2013/0152065 A1* | 6/2013 | Nishikawa | .............. | G06F 8/654 |
| | | | | 717/170 |
| 2018/0365423 A1* | 12/2018 | Poppe | .................... | G05B 19/00 |

OTHER PUBLICATIONS

EPSON Projector Firmware Update, [Online], 2014, pp. 1-1, [Retrieved from internet on Mar. 19, 2021], <https://files.support.epson.com/docid/cpd4/cpd41586.pdf> (Year: 2014).*

Nikolov, "Research Firmware Update Over the Air from the Cloud", [Online], 2018, pp. 1-4, [Retrieved from internet on Nov. 1, 2021], <https://ieeexplore.ieee.org/stamp/stamp.jsp?arnumber=8549628> (Year: 2018).*

* cited by examiner

PROJECTOR AND PROJECTOR FIRMWARE UPDATING METHOD

CROSS-REFERENCE TO RELATED APPLICATION

This application claims the priority benefit of China application serial no. 201910141644.5, filed on Feb. 26, 2019. The entirety of the above-mentioned patent application is hereby incorporated by reference herein and made a part of this specification.

BACKGROUND OF THE DISCLOSURE

Field of the Disclosure

The disclosure relates to an optical device and a firmware updating method, and more particularly to a projector and a projector firmware updating method.

Description of Related Art

Typically, in order to update the firmware of a projector, the user has to connect the projector to the computer host and the network by himself/herself, and the user needs to control the computer host to install the latest firmware of the projector.

However, the above firmware updating method requires the user to find and perform firmware installation. In the conventional firmware updating process, it is possible to update the wrong firmware to the projector, and the firmware updating operation is likely to fail due to the wrong firmware, or the projector is malfunctioned after the firmware is updated. Therefore, how to improve the efficiency and accuracy of projector firmware updating operation has drawn relevant personnel's attention in the field.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE DISCLOSURE

The disclosure provides a projector and a projector firmware updating method therefor, which can efficiently update a firmware of a projector to a latest version or a specific version according to a unique identification code of the projector.

An embodiment of the disclosure provides a projector. The projector includes a first communication unit, a projection unit, an input unit, and a first processor. The first communication unit is used to establish a network connection, wherein the projector is connected to a cloud server via a network connection. The projection unit is used to project a picture corresponding to an image data. The input unit is used to receive an input operation. The first processor is coupled to the first communication unit, the projection unit, and the input unit. The first processor executes a first firmware updating process corresponding to a request firmware, wherein in the first firmware updating process, the first processor is used to identify a first request unique identification code of the projector and a request firmware serial number of the request firmware, and instruct the first communication unit to transmit the first request unique identification code and the request firmware serial number to the cloud server through the network connection. Specifically, if the request firmware of the projector is not the latest version, the first processor receives a first target firmware from the cloud server through the network connection, wherein the first processor is used to update the request firmware by using the received first target firmware, and complete the first firmware updating process.

An embodiment of the disclosure provides a projector firmware updating method. The projector firmware updating method includes: establishing a network connection to a cloud server by using a projector; and executing, by the projector, a first firmware updating process corresponding to a request firmware, wherein the first firmware updating process includes: identifying, by the projector, a first request unique identification code of the projector and a request firmware serial number of the request firmware, and transmitting the first request unique identification code and the request firmware serial number to the cloud server through the network connection; if the request firmware is not the latest version, receiving the first target firmware by the projector through the network connection; and after receiving the first target firmware, updating the request firmware through the received first target firmware by the projector and completing the first firmware updating process.

Based on the above, the projector and the projector firmware updating method provided by the embodiments of the disclosure can efficiently and automatically update the firmware of the projector to the latest version according to the unique identification code of the projector, and also allow the projector with different unique identification code to update the firmware to a specific version through manual firmware updating operation, such that the firmware of the projector can be efficiently maintained at the latest version and the overall performance can be improved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. Besides, the terminology "signal" may refer to as at least one current, voltage, charge, temperature, data, electromagnetic wave, or any other one or more signal.

Figure 1:
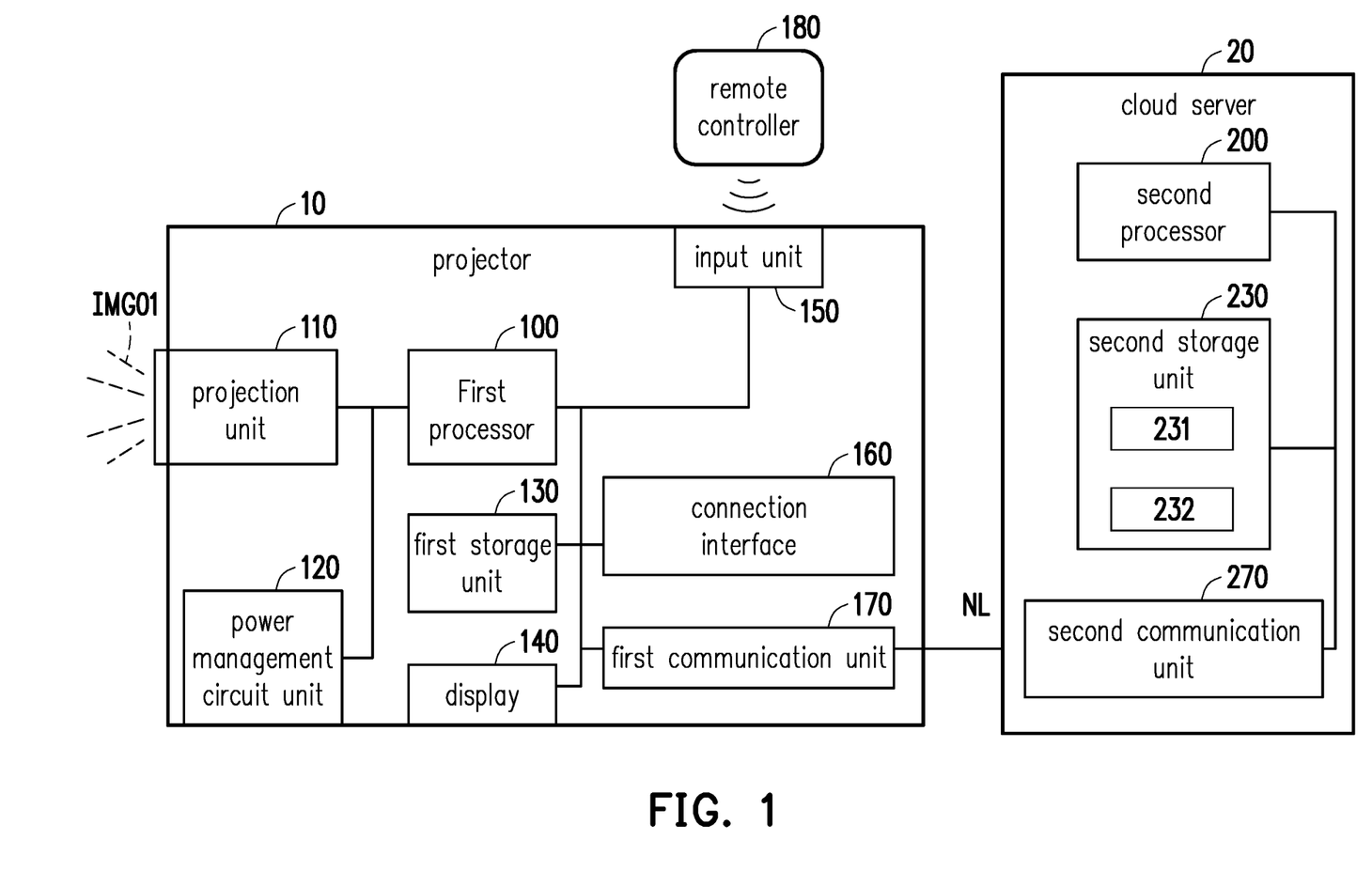
FIG. 1 is a schematic block diagram of a projector and a cloud server according to an embodiment of the disclosure.

FIG. 1 is a schematic block diagram of a projector and a cloud server according to an embodiment of the disclosure.

Referring to FIG. 1, a projector 10 includes a first processor 100, a projection unit 110, a power management circuit unit 120, a first storage unit 130, a display 140, an input unit 150, a connection interface 160, and a first communication unit 170. The first processor 100 is coupled to the projection unit 110, the power management circuit unit 120, the first storage unit 130, the display 140, the input unit 150, the connection interface 160, and the first communication unit 170.

The first communication unit 170 is used to establish a network connection NL in a wired or wireless manner. The projector 10 can be connected to the cloud server 20 through the network connection NL. The cloud server 20 includes a second processor 200, a second storage unit 230, and a second communication unit 270.

In the embodiment, the first processor 100 and the second processor 200 are hardware having computing capability. The first processor 100 is used to execute one or more program codes to manage the overall operation of the projector 10; the second processor 200 is used to execute one or more program codes to manage the overall operation of the cloud server. In this embodiment, the first processor 100 or the second processor 200 is, for example, a one-core or multi-core central processing unit (CPU), a programmable general-purpose or specific-purpose micro-processor, a digital signal processor (DSP), a programmable controller, application specific integrated circuits (ASIC), a programmable logic device (PLD), or the like.

The projection unit 110 is used to receive an image data (e.g., image data received from the data terminal or image data of a user interface generated by the first processor 100), and project a picture corresponding to the image data. Specifically, the projection unit 110 projects an image beam according to the image data to form a projection image projected on a projection plane. The projection unit 110 includes a light source module and an optical engine (not shown). The optical engine includes a light valve and a projection lens (not shown). The light source module is used to provide an illumination beam. The light valve is, for example, a digital micro-mirror device (DMD) disposed on a transmitting path of the illumination beam and used to convert the illumination beam into an image beam. The projection lens is disposed on the transmitting path of the image beam and is used to project the image beam out of the projection unit 110.

The power management circuit unit 120 is used to manage the power of the projector 10. The power management circuit unit 120 is also used to receive power (for example, mains power supply, or other forms of external power) from the outside. The power management circuit unit 120 can also be provided with an independent internal power, such as a battery.

The first storage unit 130 is used to temporarily store data through an instruction of the first processor 100, wherein the data includes data for managing the projector 10, data received from an external electronic device (a host system such as a personal computer, a notebook computer, or a server), data to be transmitted to the host system or other types of data, the disclosure is not limited thereto. In addition, the first storage unit 130 can also record some data that needs to be stored for a long time, for example, firmware or software (for example, projector firmware updating module) for managing the projector 10. Additionally, the first storage unit 130 can be a non-volatile memory storage device in any forms.

Similarly, the second storage unit 230 is used to temporarily store data through an instruction of the second processor 200, wherein the data includes data for managing the cloud server 20, data received from an external electronic device (such as the projector 10), data to be transmitted to the projector 10 or other types of data, the disclosure is not limited thereto. In addition, the second storage unit 230 can also record some data that needs to be stored for a long time, for example, firmware or software for managing the cloud server 20, a firmware database 231 and a mapping table 232. The mapping table 232 records a plurality of unique identification codes and a plurality of firmware serial numbers respectively corresponding to the plurality of unique identification codes. The firmware database 231 stores a plurality of firmwares, wherein the plurality of firmwares respectively correspond to a plurality of firmware serial numbers. Additionally, the second storage unit 230 can be a non-volatile memory storage device in any forms.

The display 140 is used to display image or text of a corresponding operation function of the projector. For example, the display 140 may be a liquid crystal display (LCD), a light-emitting diode (LED) display, or a field emission display (FED). In other embodiments, the projector 10 may not include the display 140. In this case, the projection unit 110 may be used to project an image or text of a corresponding operation function of the projector.

The input unit 150 is used to receive an input operation applied by the user to the input unit 150 to generate a corresponding input signal. The first processor 100 can perform a corresponding function or operation according to the input signal. The input unit 150 may include a plurality of buttons, switches or knobs corresponding to different functions. The input unit 150 can also be connected to other external input devices (e.g., a keyboard, a mouse, etc.). In another embodiment, the input unit 150 further has an infrared receiver to receive infrared rays from a remote controller 180, thereby generating corresponding control signals to the first processor 100 to perform corresponding functions. In addition, the input unit 150 can also receive instructions from other electronic devices through the first communication unit 170 to generate corresponding input signals. Further, the disclosure is not limited to the specific forms of the plurality of input operations disclosed in the following embodiments. Multiple input operations may be implemented by pressing a button, using a touch screen, clicking a mouse, using a keyboard, or the like, or a combination thereof.

In an embodiment, the display 140 can also be integrated with the input unit 150 as a touch screen composed of, for example, a resistive, capacitive or an optical touch panel to provide display and touch input functions simultaneously.

The connection interface 160 is used to be connected to the data terminal to receive image data from the data terminal. The data terminal is, for example, any electronic device that can output image data, such as a personal computer, a notebook computer, a server host, an external storage device, a smart phone, a tablet computer, and the like. The connection interface 160 can be a circuit interface that includes a plurality of input interfaces. The input interface is, for example, an input surface conforming to the Video Graphics Array (VGA) standard, the Digital Visual Interface (DVI) standard, the High Definition Multimedia Interface (HDMI) standard, or other suitable standard. However, the disclosure is not limited thereto.

For example, in another embodiment, the connection interface 160 may also include being compatible with a Serial Advanced Technology Attachment (SATA) standard. However, it should be understood that the disclosure is not limited thereto, and the connection interface 160 may also be an interface circuit unit conforming to the Parallel Advanced Technology Attachment (PATA) standard, the Institute of Electrical and Electronic Engineers (IEEE) 1394 standard, the Peripheral Component Interconnect Express (PCI Express) standard, the Universal Serial Bus (USB) standard, the Ultra High Speed-I (UHS-I) interface standard, the Ultra High Speed-II (UHS-II) interface standard, the Secure Digital (SD) interface standard, the Memory Stick (MS) interface standard, the Multi Media Card (MMC) interface standard, the Compact Flash (CF) interface standard, the Integrated Device Electronics (IDE) standard or other suitable standard.

The first communication unit 170 and the second communication unit 270 can have a wireless communication module (not shown) and support one of a Wireless Fidelity (WiFi) system and a Bluetooth communication technology or a combination thereof, but is not limited thereto. In addition, the first communication unit 170 and the second communication unit 270 may further include a network interface card (NIC) connected to the network through the connected network line. In other words, the first communication unit 170 and the second communication unit 270 can establish the network connection NL in a wireless or wired manner to connect the projector 10 to the cloud server 20. The projector 10 and the cloud server 20 can transmit data or instructions to each other through the network connection NL.

In addition, the functional descriptions of the components of the projector 10 and the cloud server 20 are merely exemplary and are not intended to limit the disclosure. In addition, the operations of the components of the projector 10 and the cloud server 20 can be regarded as the overall operation of the projector 10 and the cloud server 20.

Figure 2:
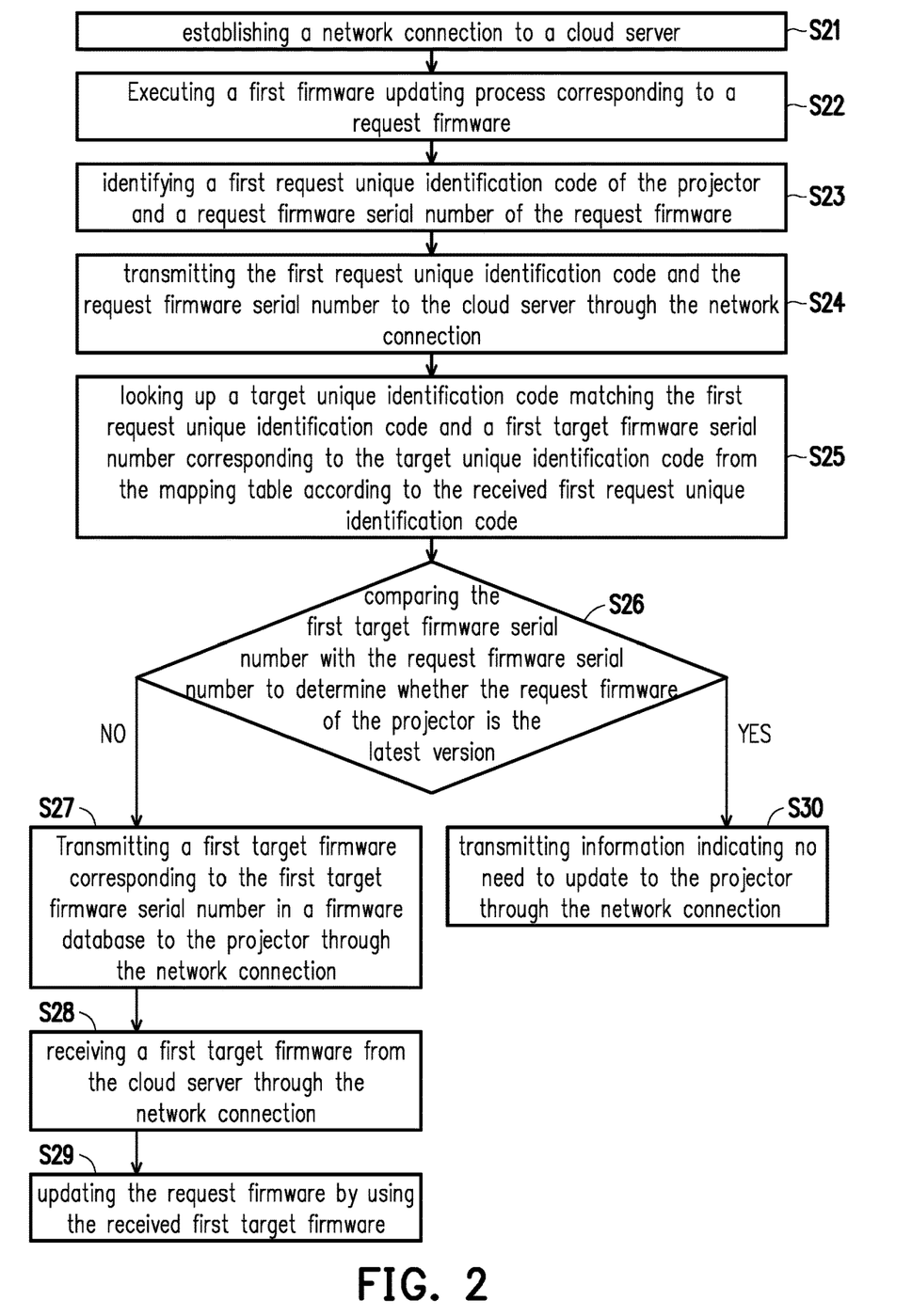
FIG. 2 is a flow chart of a firmware updating method for a projector according to an embodiment of the disclosure.

In this embodiment, after the projector 10 is powered on and the network connection NL is also established, the first processor 100 can automatically access and execute the projector firmware updating module from the first storage unit 130 to execute the first firmware updating process corresponding to the request firmware of the projector 10, thereby implementing the projector firmware updating method provided by the embodiment; FIG. 2 is incorporated below for description.

FIG. 2 is a flow chart of a firmware updating method for a projector according to an embodiment of the disclosure. Referring to FIG. 2, in step S21, the first processor 100 instructs the first communication unit 170 to establish the network connection NL to the cloud server 20. Specifically, as described above, the first communication unit 170 and the second communication unit 270 can establish the network connection NL in a wireless or wired manner, so that the projector 10 is connected to the cloud server 20 through the network connection NL.

Next, in step S22, the first processor 100 executes the first firmware updating process corresponding to the request firmware. For example, when the network connection NL has been established, the first processor 100 can automatically execute the first firmware updating process corresponding to the request firmware. Steps of the first firmware updating process include steps S23 to S30.

In step S23, the first processor 100 identifies the first request unique identification code of the projector 10 and the request firmware serial number of the request firmware.

Specifically, after starting to execute the first firmware updating process, the first processor 100 reads the unique identification code (i.e., the first request unique identification code) of the projector 10 from, for example, a system storage area of the first storage unit 130 or other secure storage area. In the embodiment, each projector shipped from factories has an exclusive unique identification code for identifying the projector. The first processor 100 can also read the request firmware serial number of the request firmware of the projector 10 from, for example, a system storage area of the first storage unit 130 or other secure storage area. The firmware of the projector 10 can be used to manage the overall operation of the projector 10. That is, after the power is turned on, the first processor 100 first loads the firmware from the system storage area of the first storage unit 130 or other secure storage area to execute various operations of the projector 10. The projector firmware updating module can also be included in the firmware. The firmware itself can also record the version number of the firmware, and the version number is the firmware serial number of the firmware.

After identifying the first request unique identification code and the request firmware serial number, proceeding to step S24, the first processor 100 transmits the first request unique identification code and the request firmware serial number to the cloud server 20 through the network connection NL. For example, the first processor 100 generates and transmits the firmware updating request including the first request unique identification code and the request firmware serial number to the cloud server 20, so that the cloud server 20 determines whether to update the request firmware of the projector 10 according to the firmware updating request. On this occasion, after receiving the first request unique identification code and the request firmware serial number, the cloud server 20 starts to determine whether to perform corresponding update on the firmware of the projector 10.

In step S25, the second processor 200 looks up the target unique identification code matching the first request unique identification code and the first target firmware serial number corresponding to the target unique identification code from a mapping table 232 according to the received first request unique identification code. For example, the second processor 200 can compare the first request unique identification code with a plurality of unique identification codes in the mapping table 232.

If the plurality of unique identification codes do not have the target unique identification code matching the first request unique identification code, it represents that the mapping table 232 does not have any unique identification code identical with the first request unique identification code. In an embodiment, the second processor 200 transmits error information to the first processor 100 of the projector 10 through the network connection NL. The first processor 100 instructs the projection unit 110 to project a notification interface (e.g., a graphic user interface) according to the received error information. The notification interface is used to prompt the user to perform the second firmware updating process or terminate the first firmware updating process. That is, when the first request unique identification code cannot be found from the mapping table 232 of the cloud server 20, this condition can represent that the first request unique identification code is erroneous. On this occasion, the user can know the occurrence of the error through the projected notification interface, and the user can apply an input operation to the input unit 150 to select to execute the second firmware updating process or terminate the first firmware updating process. The input unit 150 generates a corresponding input signal according to the user's selection (input operation) to instruct the first processor 100 to correspondingly execute the second firmware updating process or terminate the currently executed first firmware updating process.

If there is a target unique identification code matching the first request unique identification code in the plurality of unique identification codes, the second processor 200 can identify the first target firmware serial number mapped to the target unique identification code through the mapping table 232.

Next, in step S26, the second processor 200 compares the first target firmware serial number with the request firmware serial number to determine whether the request firmware of the projector 10 is the latest version.

Specifically, the second processor 200 determines whether the first target firmware serial number is the same as the request firmware serial number. In addition, the plurality of firmware serial numbers mapped to the plurality of unique identification codes recorded in the mapping table 232 will be the latest firmware serial numbers.

If the first target firmware serial number is not the same as the request firmware serial number, the second processor 200 determines that the request firmware of the projector 10 corresponding to the request firmware serial number is not the latest version. On the other hand, if the first target firmware serial number is the same as the request firmware serial number, the second processor 200 determines that the request firmware of the projector 10 corresponding to the request firmware serial number is the latest version.

If it is determined that the request firmware is not the latest version, proceeding to step S27, the second processor 200 transmits the first target firmware corresponding to the first target firmware serial number in the firmware database 231 to the projector 10 through the network connection NL. Specifically, the second processor 200 looks up the firmware (the first target firmware) corresponding to the first target firmware serial number from the firmware database 231, and instructs the second communication unit 270 to transmit the first target firmware to the projector 10 through the established network connection NL.

In contrast, if it is determined that the request firmware is the latest version, the process proceeds to step S30, the second processor 200 does not need to update the request firmware, and the second processor 200 transmits the information indicating no need to perform updating operation to the projector 10 through the network connection NL. Specifically, the second processor 200 instructs the second communication unit 270 to transmit the information indicating no need to perform updating operation to the projector 10 through the network connection NL. The information indicating no need to perform updating operation is used to instruct that the current request firmware is the latest version. The first processor 100 ends the firmware updating process according to the received information indicating no need to perform updating operation. In an embodiment, the first processor 100 further instructs the projection unit 110 (or the display 140) to display a picture or text according to the received information indicating no need to perform updating operation, which is used to indicate that the current firmware of the projector 10 is the latest version.

If the request firmware of the projector 10 is not the latest version, after performing step S27, in step S28, the first processor 100 receives the first target firmware from the cloud server 20 through the network connection NL. As described above, if the request firmware of the projector 10 is not the latest version, the first target firmware is transmitted to the projector 10 by the cloud server 20, that is, the projector 10 starts downloading the first target firmware. After the projector 10 completes the download of the first target firmware, the process proceeds to step S29, and the first processor 100 updates the request firmware by using the received first target firmware. After the request firmware is completely updated, the first processor 100 also completes the executed first firmware updating process. In addition, after the step of using the received first target firmware to update the request firmware is completed, the request firmware serial number corresponding to the request firmware in the projector 10 is updated to the first target firmware serial number corresponding to the first target firmware.

In an embodiment, after the first processor 100 completes the operation of updating the request firmware by using the firmware received from the cloud server 20, the first processor 100 may transmit the corresponding update completion information to the second processor 200 of the cloud server 20 through the network connection NL. In this manner, the second processor 200 can confirm that the request firmware of the projector 10 has been updated to the latest version, that is, the corresponding firmware updating process has been completed.

Figure 3:
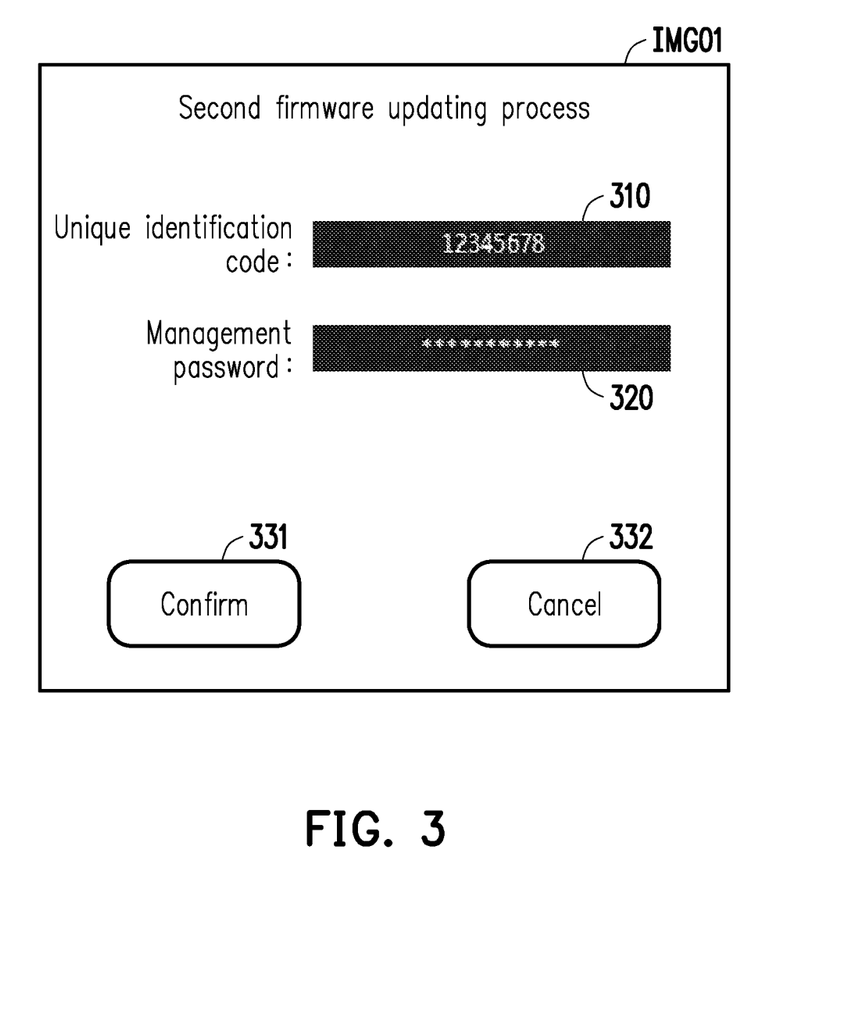
FIG. 3 is a schematic view showing a picture of a user interface of a second firmware updating process according to an embodiment of the disclosure.

FIG. 3 is a schematic view showing a picture of a user interface of a second firmware updating process according to an embodiment of the disclosure. Referring to FIG. 3, after the user selects to execute the second firmware updating process, the first processor 100 may execute the second firmware updating process. Initially, the first processor 100 can instruct the projection unit 100 to project a picture IMG01 corresponding to the user interface of the second firmware updating process. The user interface may include a field 310 for inputting a unique identification code, a field 320 for inputting a management password, a confirm button 331 and a cancel button 332.

That is, the user can input a unique identification code (also referred to as a second request unique identification code) and a management password in the field 310 and the field 320, and confirm the input operation of the second request unique identification code and the management password for the second firmware updating process by triggering the confirm button 331. Further, when the cancel button 332 is triggered, the second firmware updating process will be terminated by the first processor 100.

Moreover, in an embodiment, the second request unique identification code can be the correct unique identification code of the projector 10. However, the disclosure is not limited thereto, and the second request unique identification code can also be used to provide a customized firmware for the projector 10. Specifically, in another embodiment, the second request unique identification code may be a customized special identification code corresponding to the projector 10, which may be used to instruct the cloud server 20 to transmit a special firmware of the projector corresponding to the special identification code to the projector 10. That is to say, according to the different second request unique identification code and management password that are inputted, the cloud server 20 can transmit the corresponding firmware to the projector 10. In this way, the user can obtain the latest version of the firmware according to the second request unique identification code which is the correct unique identification code of the projector 10, and the user can also obtain the customized special firmware according to the second request unique identification code which is the customized (tailored) special identification code corresponding to the projector 10, thereby further enhancing the function expandability of the projector.

The first processor 100 may obtain the second request unique identification code input to the field 310 and the management password input to the field 320 through the input operation received by the input unit 150. Next, the first processor 100 transmits the second request unique identification code and the management password to the cloud server 20 through the network connection NL. For example, the first processor 100 can generate and transmit another firmware request information including the second request unique identification code and the management password to the cloud server 20.

After the second processor 200 of the cloud server 20 receives the second request unique identification code and the management password, the second processor 200 verifies whether the second request unique identification code is valid according to the second request unique identification code and the management password.

In detail, in an embodiment, the second processor 200 may input the second request unique identification code to a verification password generator to obtain a first verification password corresponding to the second request unique identification code. If the management password is the same as the first verification password, the second processor 200 determines that the second request unique identification code is valid. If the management password is different from the first verification password, the second processor 200 determines that the second request unique identification code is invalid. The verification password generator is, for example, a password generating program to generate and output a password according to the inputted number. Moreover, in an embodiment, the verification password generator may convert the inputted second request unique identification code into the first verification password through a predetermined computing formula.

In another embodiment, the second processor 200 can look up a password table according to the second request unique identification code to obtain a second verification password corresponding to the second request unique identification code in the password table. If the management password is the same as the second verification password, the second processor 200 determines that the second request unique identification code is valid. If the management password is different from the second verification password, the second processor 200 determines that the second request unique identification code is invalid. In addition, if there is no second verification password corresponding to the second request unique identification code in the password table, the second processor 200 determines that the second request unique identification code is invalid. The password table can be recorded in the second storage unit 230.

If it is determined that the second request unique identification code is valid, the second processor 200 looks up the second target firmware serial number corresponding to the second request unique identification code from the mapping table 232 according to the received second request unique identification code. Next, the second processor 200 instructs the second communication unit 270 to transmit the second target firmware corresponding to the second target firmware serial number in the firmware database 231 to the projector 10 through the network connection NL. In this manner, the first processor 100 updates the firmware corresponding to the second request unique identification code by using the received second target firmware, and completes the second firmware updating process.

If it is determined that the second request unique identification code is invalid, the second processor 200 may instruct the second communication unit 270 to transmit another error message, which is used to indicate that the inputted second request unique identification code is invalid. The first processor 100 can instruct the projection unit 110 (or the display 140) to display a corresponding text or picture accordingly, and the first processor 100 can execute the user interface corresponding to the second firmware updating process again.

In addition, the first firmware updating process may be regarded as a firmware updating process that can be automatically executed by the projector 10 itself, and the second firmware updating process may be regarded as a firmware updating process that needs to be executed by manually inputting corresponding information by the user. Further, in the above embodiment, the second firmware updating process can only be executed after the first firmware updating process is failed, but the disclosure is not limited thereto.

Figure 4:
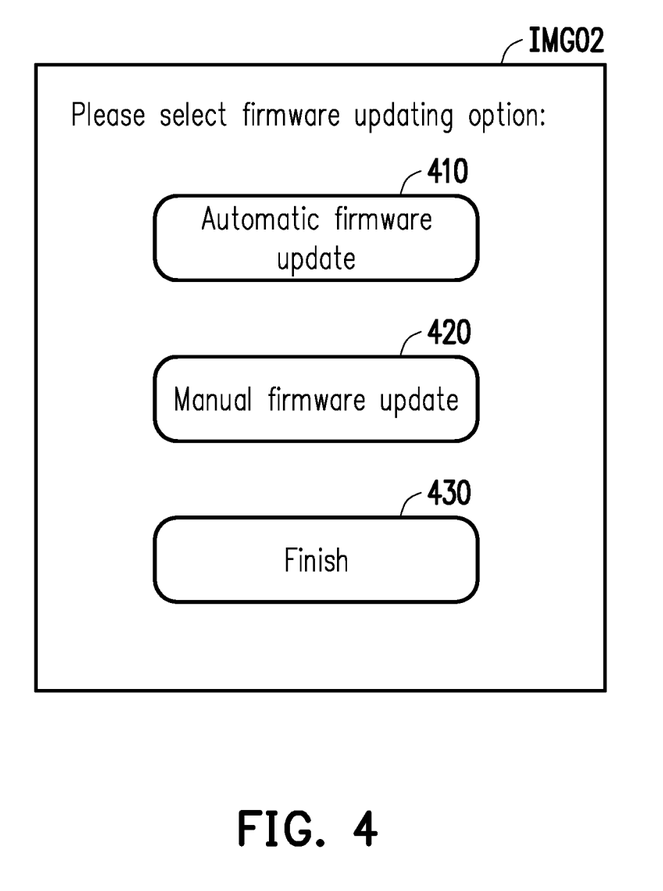
FIG. 4 is a schematic view showing a picture of a user interface of a firmware updating option according to an embodiment of the disclosure.

FIG. 4 is a schematic view showing a picture of a user interface of a firmware updating option according to an embodiment of the disclosure. Referring to FIG. 4, for example, in another embodiment, before the first firmware updating process and the second firmware updating process are executed, for example, after the projector 10 is powered on and the network connection NL is established, the first processor 100 can instruct the projection unit 110 to project a firmware updating interface (such as the picture IMG02 shown in FIG. 4), wherein the firmware updating interface provides a plurality of options, and the options include options respectively corresponding to the following operations: executing the first firmware updating process (e.g., automatic firmware updating button 410); executing the second firmware updating process (e.g., manual firmware updating button 420); and not executing the firmware updating process (e.g., finish button 430).

In this manner, the user can select one of the above multiple options to determine the operation to be executed. The first processor 100 can determine whether to execute the first firmware updating process, the second firmware updating process, or not to execute any firmware updating process through the input operations of different buttons 410, 420, 430.

In addition, the text and forms of the user interface shown in FIG. 3 and FIG. 4 are exemplary and are not intended to limit the disclosure.

In summary, the projector and the projector firmware updating method provided by the embodiments of the disclosure can efficiently and automatically update the firmware of the projector to the latest version according to the unique identification code of the projector, and also allow the projector with different unique identification code to update the firmware to a specific version through manual firmware updating operation, such that the firmware of the projector can be efficiently maintained at the latest version and the overall performance can be improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projector system, comprising a projector and a cloud server, wherein the projector comprises a first communication unit, a projection unit, an input unit and a first processor, wherein:
   the first communication unit is configured to establish a network connection, wherein the projector is connected to the cloud server through the network connection;
   the projection unit is configured to project a picture corresponding to an image data;
   the input unit is configured to receive an input operation; and
   the first processor is coupled to the first communication unit, the projection unit, and the input unit, wherein the first processor of the projector executes a first firmware updating process corresponding to a request firmware,
   wherein during the first firmware updating process,
   the first processor of the projector is configured to identify a first request unique identification code of the projector and a request firmware serial number of the request firmware, and the first processor of the projector is configured to instruct the first communication unit to transmit both the first request unique identification code and the request firmware serial number to the cloud server through the network connection,
   wherein when the cloud server determines that the request firmware of the projector is not the latest version, the first processor of the projector receives a first target firmware from the cloud server through the network connection,
   wherein the first processor of the projector is configured to update the request firmware by using the received first target firmware, and complete the first firmware updating process,
   wherein the cloud server comprises a second processor, the first request unique identification code and the request firmware serial number are transmitted to the second processor of the cloud server through the network connection, and the second processor of the cloud server is configured to look up a target unique identification code matching the first request unique identification code and look up a first target firmware serial number corresponding to the target unique identification code from a mapping table according to the received first request unique identification code,
   wherein an operation that the second processor of the cloud server is configured to look up the target unique identification code matching the first request unique identification code and look up the first target firmware serial number corresponding to the target unique identification code from the mapping table according to the received first request unique identification code comprises:
      if the mapping table does not have the target unique identification code matching the first request unique identification code, the second processor of the cloud server transmits an error information to the first processor of the projector through the network connection,
   wherein the first processor of the projector instructs the projection unit to project a notification interface according to the received error information, wherein the notification interface is configured to prompt a user to perform a second firmware updating process or terminate the first firmware updating process.

2. The projector system according to claim 1, wherein, after an operation of updating the request firmware by using the received first target firmware is completed, the first processor of the projector transmits an update completion information to the cloud server through the network connection.

3. The projector system according to claim 1, wherein the cloud server further comprises:
   a second communication unit and a storage unit, wherein the storage unit stores a firmware database and the mapping table, wherein the mapping table records a plurality of unique identification codes and a plurality of firmware serial numbers respectively corresponding to the plurality of unique identification codes,
   wherein the second processor of the cloud server is configured to compare the first target firmware serial number with the request firmware serial number to determine whether the request firmware of the projector is the latest version,
   wherein if it is determined that the request firmware of the projector is not the latest version, the second processor of the cloud server is configured to instruct the second communication unit to transmit the first target firmware corresponding to the first target firmware serial number in the firmware database to the projector through the network connection.

4. The projector system according to claim 3, wherein after an operation of updating the request firmware by using the received first target firmware is completed, the request firmware serial number corresponding to the request firmware in the projector is updated to correspond to the first target firmware serial number of the first target firmware.

5. The projector system according to claim 1, wherein in the second firmware updating process, the first processor of the projector obtains a second request unique identification code and a management password through an input operation received by the input unit, wherein the first processor of the projector transmits the second request unique identification code and the management password to the cloud server through the network connection, wherein the second processor of the cloud server verifies whether the second request unique identification code is valid according to the second request unique identification code and the management password, wherein if it is determined that the second request unique identification code is valid, the second processor of the cloud server looks up a second target firmware serial number corresponding to the second request unique identification code from the mapping table according to the received second request unique identification code, wherein the second processor of the cloud server instructs the second communication unit to transmit a second target firmware corresponding to the second target firmware serial number in the firmware database to the projector through the network connection, wherein the first processor of the projector updates a firmware corresponding to the second request unique identification code by using the received second target firmware, and completes the second firmware updating process.

6. The projector system according to claim 5, wherein before executing the first firmware updating process and the second firmware updating process, the first processor of the projector instructs the projection unit to project a firmware updating interface, wherein the firmware updating interface provides a plurality of options, the plurality of options comprising options respectively corresponding to the following operations: executing the first firmware updating process; executing the second firmware updating process; and not executing the firmware updating process.

7. The projector system according to claim 5, wherein in an operation that the second processor of the cloud server verifies whether the second request unique identification code is valid according to the second request unique identification code and the management password, the second processor of the cloud server inputs the second request unique identification code to a verification password generator to obtain a first verification password corresponding to the second request unique identification code, wherein if the management password is the same as the first verification password, the second processor of the cloud server determines that the second request unique identification code is valid; or the second processor of the cloud server looks up in a password table according to the second request unique identification code to obtain a second verification password corresponding to the second request unique identification code in the password table, wherein if the management password is the same as the second verification password, the second processor of the cloud server determines that the second request unique identification code is valid.

8. A projector firmware updating method, comprising:

establishing a network connection to a cloud server by a projector;

executing, by the projector, a first firmware updating process corresponding to a request firmware, wherein the first firmware updating process comprises:

identifying, by the projector, a first request unique identification code of the projector and a request firmware serial number of the request firmware, and transmitting the first request unique identification code and the request firmware serial number to the cloud server through the network connection;

receiving, by the projector, a first target firmware through the network connection when determining that the request firmware is not the latest version by the cloud server; and after the first target firmware is received by the projector, updating the request firmware by using the received first target firmware by the projector, and completing the first firmware updating process, wherein the projector firmware updating method further comprising:

looking up, by the cloud server, a target unique identification code matching the first request unique identification code and a first target firmware serial number corresponding to the target unique identification code from a mapping table according to the received first request unique identification code, wherein the step of looking up the target unique identification code matching the first request unique identification code and the first target firmware serial number corresponding to the target unique identification code from the mapping table according to the received first request unique identification code comprises:

if the mapping table does not have the target unique identification code matching the first request unique identification code, transmitting, by the cloud server, an error information to the projector through the network connection; and projecting a notification interface by the projector according to the received error information, wherein the notification interface is configured to prompt a user to perform a second firmware updating process or terminate the first firmware updating process.

9. The projector firmware updating method according to claim 8, further comprising:

after the step of updating the request firmware by using the received first target firmware is completed, transmitting an update completion information to the cloud server through the network connection by the projector.

10. The projector firmware updating method according to claim 8, wherein the cloud server stores a firmware database and the mapping table, wherein the mapping table records a plurality of unique identification codes and a plurality of firmware serial numbers respectively corresponding to the plurality of unique identification codes, the projector firmware updating method further comprising:

comparing, by the cloud server, the first target firmware serial number with the request firmware serial number to determine whether the request firmware of the projector is the latest version, wherein if it is determined that the request firmware of the projector is not the latest version, transmitting, by the cloud server, the first target firmware corresponding to the first target firmware serial number in the firmware database to the projector through the network connection.

11. The projector firmware updating method according to claim 10, further comprising:
after the step of updating the request firmware by using the received first target firmware is completed, the request firmware serial number corresponding to the request firmware in the projector is updated to correspond to the first target firmware serial number of the first target firmware.

12. The projector firmware updating method according to claim 8, wherein the second firmware updating process comprises:
obtaining, by the projector, a second request unique identification code and a management password according to a received input operation;
transmitting, by the projector, the second request unique identification code and the management password to the cloud server through the network connection;
verifying, by the cloud server, whether the second request unique identification code is valid according to the second request unique identification code and the management password;
if it is determined that the second request unique identification code is valid, looking up, by the cloud server, a second target firmware serial number corresponding to the second request unique identification code from the mapping table according to the received second request unique identification code, and transmitting a second target firmware corresponding to the second target firmware serial number in the firmware database to the projector; and
updating, by the projector, a firmware corresponding to the second request unique identification code by using the received second target firmware, and completing the second firmware updating process.

13. The projector firmware updating method according to claim 12, further comprising:
before executing the first firmware updating process and the second firmware updating process, projecting a firmware updating interface by the projector, wherein the firmware updating interface provides a plurality of options, the plurality of options comprising options respectively corresponding to the following operations: executing the first firmware updating process; executing the second firmware updating process; and not executing the firmware updating process.

14. The projector firmware updating method according to claim 12, wherein the step of verifying whether the second request unique identification code is valid according to the second request unique identification code and the management password comprises:
inputting the second request unique identification code to a verification password generator to obtain a first verification password corresponding to the second request unique identification code, wherein if the management password is the same as the first verification password, determining that the second request unique identification code is valid; or
looking up in a password table according to the second request unique identification code to obtain a second verification password corresponding to the second request unique identification code in the password table, wherein if the management password is the same as the second verification password, determining that the second request unique identification code is valid.

* * * * *